United States Patent [19]

Shimizu et al.

[11] 4,391,649
[45] Jul. 5, 1983

[54] PROCESS FOR REGENERATING A STRONGLY ACIDIC CATION EXCHANGE RESIN

[75] Inventors: Hiroshi Shimizu, Tokyo; Sigeo Sakai, Niiza; Fumihiko Matsuda, Tokorozawa; Reiko Matsumoto, Tokyo, all of Japan

[73] Assignee: Japan Organo Co., Ltd., Tokyo, Japan

[21] Appl. No.: 279,217

[22] Filed: Jun. 30, 1981

[30] Foreign Application Priority Data

Sep. 26, 1980 [JP] Japan ................ 55-132988

[51] Int. Cl.³ .................................... B01J 49/00
[52] U.S. Cl. .................... 127/46.2; 210/674; 521/26
[58] Field of Search .......... 210/632, 670, 674, 681; 435/262, 264; 521/26; 127/46.2; 134/42

[56] References Cited

U.S. PATENT DOCUMENTS

| | | | |
|---|---|---|---|
| 2,413,844 | 1/1947 | Rawlings | 127/46.2 |
| 3,122,456 | 2/1964 | Meier et al. | 127/46.2 |
| 3,669,878 | 6/1972 | Marantz et al. | 210/632 |
| 3,910,296 | 10/1975 | Karageozian et al. | 134/42 |
| 4,025,608 | 5/1977 | Tawil et al. | 210/681 |
| 4,153,761 | 5/1979 | Marsh | 521/26 |
| 4,242,450 | 12/1980 | Honda et al. | 435/262 |

Primary Examiner—Ivars C. Cintins
Attorney, Agent, or Firm—Armstrong, Nikaido, Marmelstein & Kubovcik

[57] ABSTRACT

This invention relates to a process for regenerating a strongly acidic cation exchange resin which has used for a desalting treatment or partition chromatographic separation of a sugar liquid which lowers its separation capability, by means of contacting said strongly acidic cation exchange resin with an enzyme solution.

16 Claims, 4 Drawing Figures

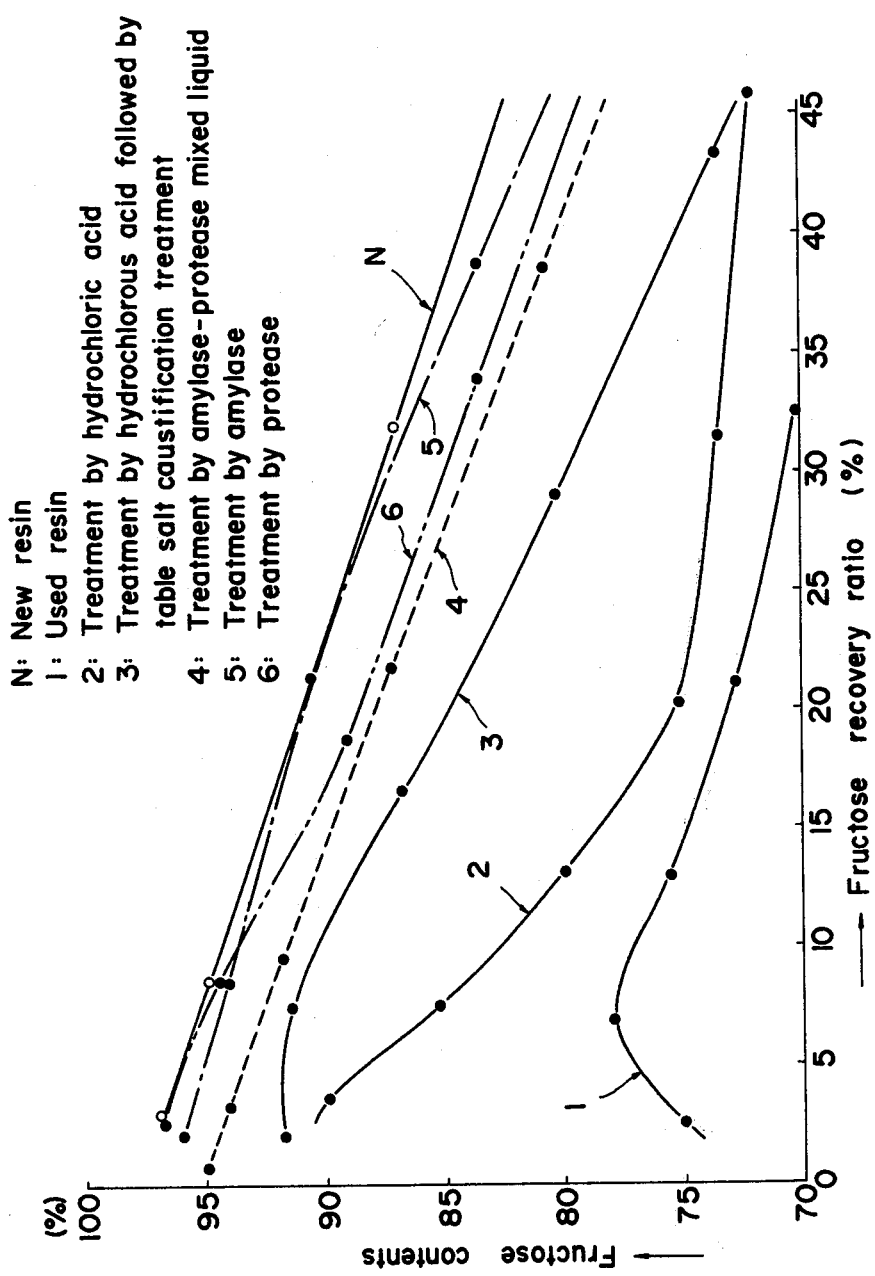

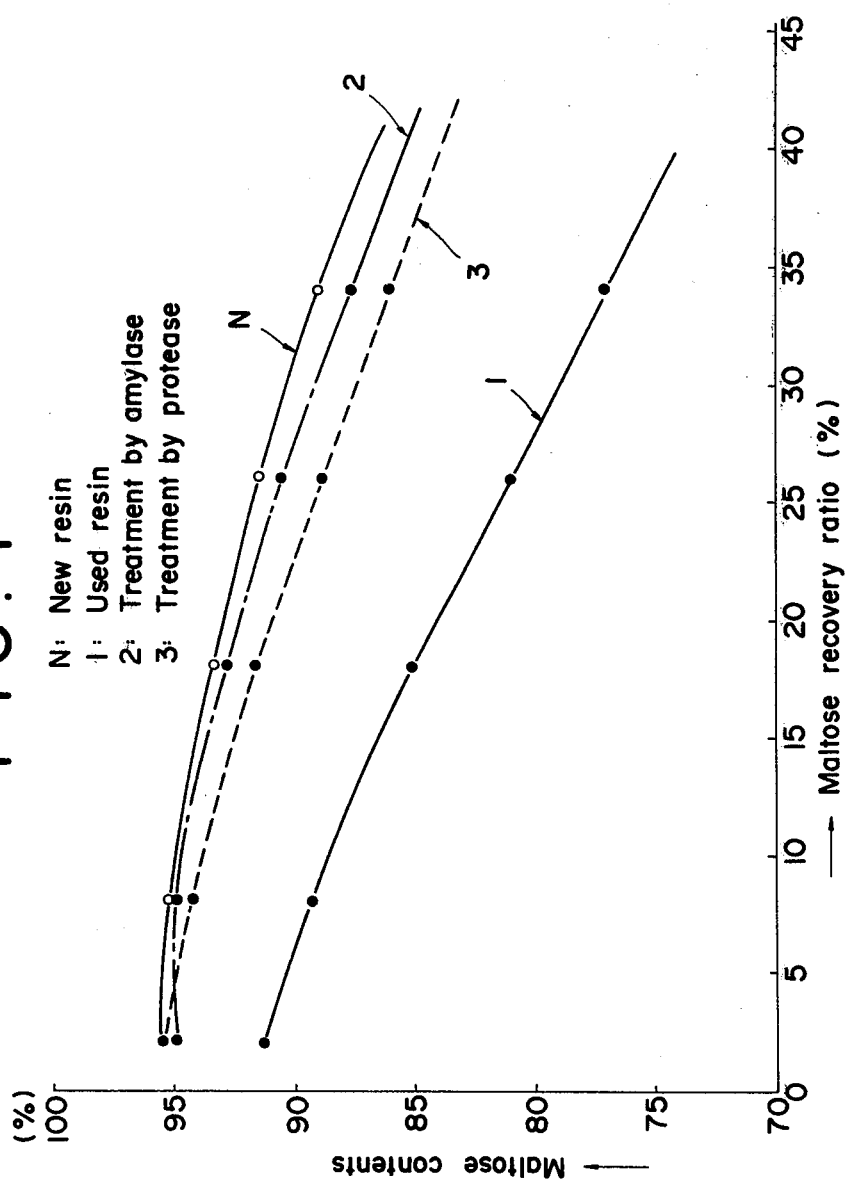

PROCESS FOR REGENERATING A STRONGLY ACIDIC CATION EXCHANGE RESIN

BRIEF DESCRIPTION OF THE DRAWINGS

FIG. 3 is a chart showing the separation capability for each resin which has undergone the respective regenerative processes in accordance with Example 1, wherein the fructose contents and fructose recovery ratio are plotted on the ordinate and abscissa, respectively; and FIG. 4 is a chart showing the separation capability for each resin which has undergone the respective regenerative processes in accordance with Example 2 wherein the maltose contents and maltose recovery ratio are plotted on the ordinate and the abscissa, respectively.

DETAILED DESCRIPTION OF THE INVENTION

This invention relates to a process for regeneration of a strongly acidic cation exchange resin which has been used in the desalting treatment of a sugar liquid or partition chromatography and has thus been lowered in its separation capability.

Among the known methods of usage of ion exchange resins is the refining of solutions by resorting to the desalting or partition chromatographic actions of the resin and without resorting to its ion exchange action.

Figure 2:
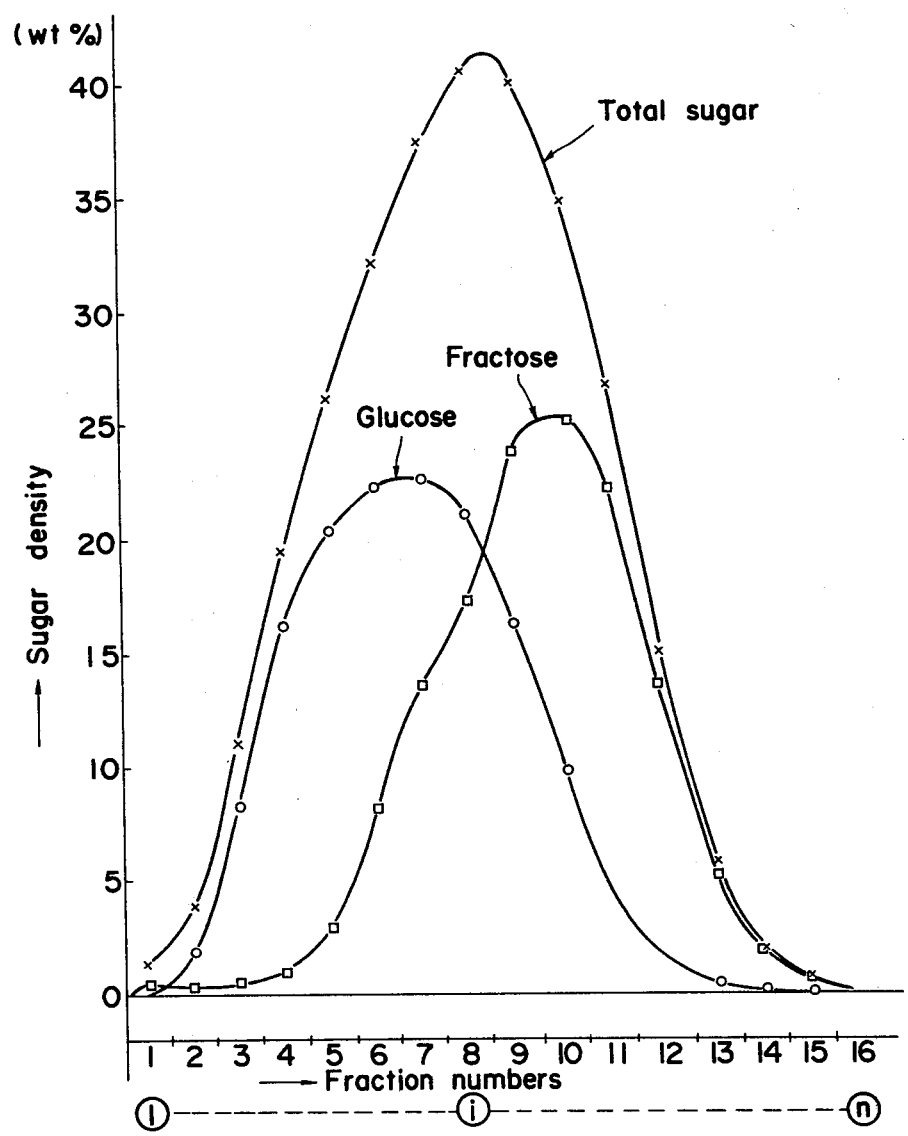
FIG. 2 is a chart showing the density distribution for each sugar contained in the effluent for the case in which the mixed glucose-fructose liquid is subjected to chromatographic separation by employing, in accordance with Example 1, the new cation exchange resin showing strong acidity, wherein sugar density and fraction numbers are plotted on the ordinate and abscissa, respectively.

Desalting is a process employed for removal of the electrolyte in a nonelectrolytic solution and comprises supplying a predetermined amount of the nonelectrolytic solution through a column charged with ion exchange resin and then supplying a predetermined amount of displacement water. This operation results in the nonelectrolyte in the solution being diffused into the ion exchange resin phase and the electrolyte being expelled from the ion exchange resin phase. Thus, the solution rich in the electrolyte flows out first of all from the column and the solution rich in the nonelectrolyte will follow the electrolyte rich solution. Hence, the nonelectrolytic solution may be refined by recovering the latter effluent. This procedure is used industrially for removal of salt from e.g. waste molasses. In this case, a strongly acidic cation exchange resin of the alkali metal type, e.g. Na type is used as the ion exchange resin. Partition chromatography, on the other hand, is a procedure employed for separating a specific nonelectrolyte from a mixed solution of a plurality of different nonelectrolytes and comprizes supplying a predetermined amount of the mixed solution through a column filled with ion exchange resin and then a predetermined amount of displacement water. In this way, the respective nonelectrolytes may be separated by reason of the differential partition or distribution of the respective non-electrolytes with respect to the ion exchange resin phase and the liquids thus separated flow out with the chromatographic density distribution as shown by way of a typical example in FIG. 2. Hence the solution rich only in a specific non-electrolyte may be separated and refined by sampling the separated liquid corresponding to the desired fraction. This procedure is used industrially for separation of fructose from a liqid sugar mixture of glucose and fructose or of maltose from a liquid sugar mixture of maltose and other sugars. In this case, strongly acidic cation exchange resins of the alkaline earth metal type, e.g. Ca type, are used for fructose separation, while strongly acidic cation exchange resins of the alkali metal type, e.g. Na type, are used for maltose separation.

In refining the nonelectrolytic solutions by thus resorting to desalting or partition chromatography of the ion exchange resins, the nonelectrolytic solutions and water are supplied through the packed bed of the strongly acidic cation exchange resin of the Na or Ca type, and the effluents are sampled in separate fractions. This operational sequence need only be repeated for effecting the desired refining and hence the routine regeneration operation which resorts to the use of regenerants may be dispensed with, in contradistinction to the customary usage of ion exchange resins which makes use of the ion exchange action of the resin. However, as described above, when using the strongly acidic cation exchange resins for refining the sugar liquid through desalting or chromatographic separation, the resins may be contaminated through prolonged use and thus lowered in their separation capability. Such reduction in the separation capability may be attributed to contamination of the resins by different organic matter of high molecular weight contained in the sugar liquid. Such tendency may be most pronounced when treating the sugar liquid obtained by starch saccharification, since polysaccharides or protein or other impurities are contained in this liquid.

The fructose liquid, which is enjoying great demand recently as artificial sweetening agent, is mostly prepared from starch. Thus, starch is saccharified to a glucose liquid and the glucose thus obtained is isomerized to a liquid mixture of glucose and fructose. Then, as described above, the strongly acidic cation exchange resin of the Ca type is used to yield the liquid rich in fructose by chromatographic separation. Maltose, which is in demand as medicine, is also prepared from starch, and ultimately refined by chromatographic separation from other sugars by using the strongly acidic cation exchange resin of the Na type. However, the high molecular weight organic components, such as protein emanating from foreign matter in the starting starch, high molecular weight polysaccharides originating from insufficient saccharification of starch or decomposition components of sugar, are included in the sugar liquid obtained by starch saccharification. These components may be deposited on the inside and outside regions of the resin particles thus acting to lower the separation capability of the resin. Moreover, low molecular weight monosaccharides or polysaccharides may be bonded to one another upon contact with the resin to yield high polymeric polysaccharides which may be deposited on and contaminate the resin. The molasses prepared from cane sugar or beets may also contaminate the resin to affect the separation capability, although to a lesser extent than those from starch sugar.

The resins thus lowered in their separation capability must be subjected to some regeneration process for desorption of the high polymer organic components deposited on the inside and outside regions of the resin particles. Customary regenerants such as mineral acid solution, caustic soda solution, table salt solution, alkaline table salt solution, acidic table salt solution, hydrochlorous acid solution or similar oxidant solutions, that are used for washing the ion exchange resins, may give poor results. These customary agents are moreover inconvenient in the following respects. When used for desalting or chromatographic separation of the sugar liquid, the strongly acidic cation exchange resins are converted to the specific ion types according to the specific usage. When the solutions of the above customary agents are used for regeneration, the ions of these particular types may be desorbed, thus necessitating a redundant process for providing the desired ion type. Moreover, when the strongly acidic cation exchange resin is of Ca type as one used for separation of fructose, or when the resin is used for other purposes but have adsorbed thereto hard components such as calcium or magnesium, use of a caustic soda solution or alkaline table salt as regenerant leads to contamination of the resin with hydroxides, thus necessitating the process of desorbing these hard components at the initial stage of the regeneration process by using for example the table salt solution, and hence complicating the regeneration process. In addition, various agents are required in the process, with an increase in the amount of waste liquid.

The object of the present invention is to obviate the above defect of the conventional regeneration process for the strongly acidic cation exchange resin which has been lowered in its separation capability through use in the chromatographic separation or desalting of the sugar liquid. The main feature of the invention resides in contacting the cation exchange resin with an enzyme solution for decomposing and removing the high polymer organic components deposited on the inside and outside regions of the resin particles.

The present invention will be described below in more detail.

The enzymes employed in the present invention are selected from a variety of enzymes comprizing amylase, protease, cellulase and lipase, with amylase or protease being most effective. Thus amylase e.g., Termamil, or Aquazime (trade name of the products both manufactured by Novo Industries Inc.) Sumitime (trade name of the product manufactured by Shinnippon Kagaku Kogyo KK) or protease such as Alkalase, Esperase, and Sabenase (trade names of products manufactured by Novo Industries Inc.) may be used singly or in combination. Amylase is preferred for processing of the strongly acidic cation exchange resin which has had its separation capacity lowered through processing the sugar liquid obtained by starch saccharification. In contacting the strongly acidic cation exchange resin which has been lowered in its separation capability with these enzyme solutions, a 0.1 to 1 wt.% aqueous solution of the enzyme may be preferred, when using, for example, the Termanil with activity of 60 KNU/g and Alkalase with activity of 0.6 AU/g, in terms of the density of the solutions used. The liquid may be used in amounts of 0.5 to 5 times the charging volume of the strongly acidic cation exchange resin, depending on the degree of contamination, in terms of the liquid quantity employed.

While the manner of indication or units of enzyme activity may be selected arbitrarily by enzyme manufacturers for different enzymes, enzymes having similar degree of activity may be used when employing amylase or protease other than Termamil or Alkalase, in accordance with activity or dilution ratio of the above Termamil or Alkalase.

The contact time of the enzyme solution is at least more than two hours and preferably more than ten hours.

When contacting the enzyme solution with the cation exchange resin with the lowered separation capability, the enzyme solution may be passed through a column filled with the resin at a lower flow rate so that the contact time is over two hours. However, the following contact mode is more preferred. The enzyme solution is adjusted to a density of 0.1 to 1% and supplied from the top or bottom of the column filled with the resin. The water is replaced in this way by the enzyme solution which may then be allowed to remain in the column for e.g. ten hours or longer. Alternatively, after replacing the water in the resin bed with the enzyme, the effluent enzyme solution is repeatedly passed through the resin bed for circulation for ten hours or longer. Thus, prolonged immersion in or prolonged circulation through the resin bed of the resin solution is more effective in making good use of the enzyme activity than simply passing the solution through the bed. The enzyme solution should be contacted with the cation exchange resin at a temperature higher than 30° C. and lower than 100° C. and preferably at a temperature of 50° to 70° C. That is, more effective decomposition of high polymer organic components and hence more effective regenerative operation may be obtained by using a temperature higher than the ambient temperature. A contact temperature higher than 100° C. is not preferred since the enzyme itself starts to be deactivated at a temperature higher than 80° C. and enzyme deactivation may proceed at an elevated rate at a temperature higher than 100° C.

According to the present invention, as described above, the high polymer organic components, especially protein and polysaccharides, that are deposited on the inside and outside regions of the resin particles, are decomposed and converted into low molecular weight components by the enzyme action for promoting their dissolution and isolating such foreign matter from the inside and outside regions of the resin particles. The inventive method has the following advantages over the conventional regeneration process which resorts to the use of solutions of regenerants.

The solution of an acid, alkali or salt, used as regenerant in the prior art, acts to rinse out the organic components deposited on the inside and outside region of the resin particles, mainly by its dissolving action, but has no positive effect to decompose and convert the high polymer organic matter into low molecular weight components that may be freely diffused through the resin bed and thus removed from the resin particles, as does the inventive process. Thus, the inventive process has markedly superior decontaminant effects. In the prior art, a solution of an oxidant such as sodium hypochlorite is used so that the high polymer components deposited on the inside and outside regions of the resin particles may be decomposed by its oxidative action. This method can not be employed frequently because the ion exchange resin itself may be injured through oxidation. The inventive regenerative process is completely harmless to the ion exchange resin itself and acts only on the organic matter contaminating the ion exchange resin. Therefore, the inventive process may be used at any desired time and acts more effectively on the organic matter than the oxidants. Moreover, precipitates may not be produced in the inventive process, irrespective of the ion types of the strongly acidic cation exchange resin, so that the strongly acidic cation exchange resins of any ion types employed for desalting or chromatographic separation may be processed in situ and without resorting to any special pretreatment. Moreover, the specific ions adsorbed on the strongly acidic cation exchange resin may not be desorbed during the regenerative process and hence the resins may be used in situ for the desalting or chromatographic separation process following the regeneration process. Hence, the regeneration operation itself may be simplified, with decrease in the amount of the waste liquid originating from the regeneration operation.

Figure 1:
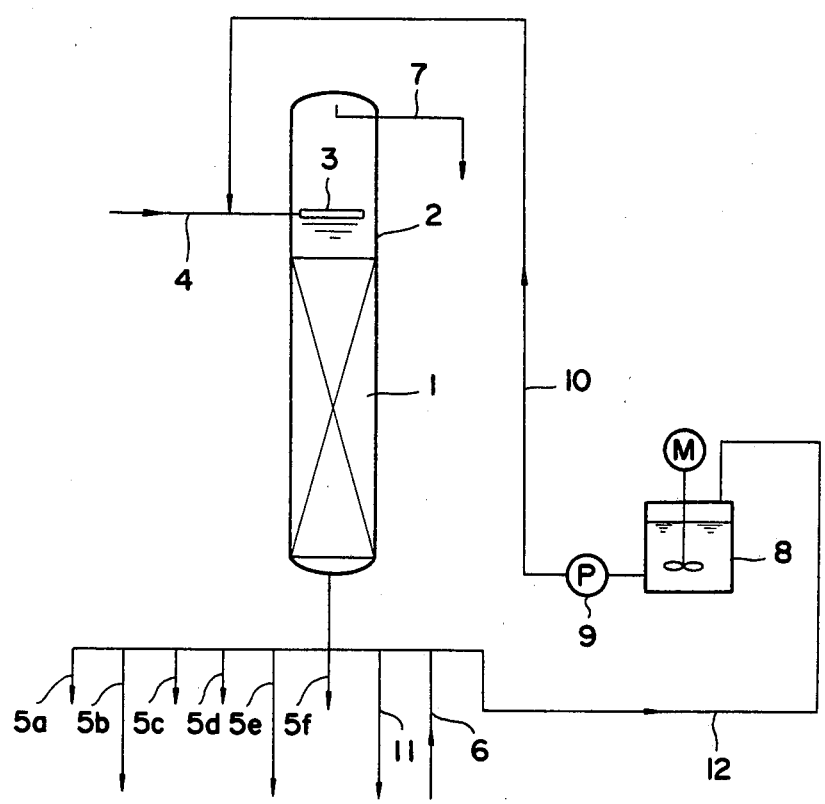
FIG. 1 shows schematically the device for chromatographic separation of the mixed glucose-fructose sugar liquid.

FIG. 1 illustrates the process flow of an apparatus in which a glucose solution obtained by saccharification of starch is subjected to isomerization to yield a mixed solution of glucose and fructose which solution is subject to a chromatographic separation step to yield a fructose solution.

The process flow is explained below. The calcium type strongly acidic cation exchange resin 1 is charged into a separation tower 2 to the upper portion of which a predetermined amount of a crude mixed solution of glucose and fructose and then a predetermined amount of displacement water are supplied through a supply pipe 4 via distributor 3 to effect the chromatographic separation of the mixed solution into glucose and fructose. The dilute glucose fraction, the glucose fraction, the glucose enriched mixed fraction, the fructose enriched mixed fraction, the fructose fraction and the fructose dilute fraction are discharged in this order from the bottom of the separation tower 2. These effluents are received by efflux pipes 5a, 5b, 5d, 5e and 5f respectively, and the glucose fraction and the fructose fraction flowing through pipes 5b and 5e, respectively are taken out from the system. The dilute glucose fraction and glucose enriched mixed fraction, taken out through pipes 5a and 5c, are again introduced into the tower 2 through supply pipe 4 in this order and then a predetermined amount of displacement water is supplied into the tower. The dilute glucose fraction, the glucose fraction, the glucose enriched mixed fraction, the fructose enriched mixed fraction, fructose fraction and dilute fructose fraction are again discharged in this order from the bottom of the tower 2, these fractions being separately received by pipes 5a through 5f as described above. The glucose fraction and fructose fraction are discharged through pipes 5b and 5e respectively by the repetition of the above process. The fructose fraction is subjected to refining and concentrating steps to yield an ultimate product, while the glucose fraction is fed back to the glucose isomerization process.

If such process for chromatographic separation of the mixed crude liquid or solution of glucose and fructose is repeated for prolonged time, the strongly acidic cation exchange resin may be contaminated by high polymeric organic matter and thus affected in its separation capability.

In this state, the regeneration process of the present invention is carried into effect and usually by the following staps. Demineralized water is supplied through supply pipe 4 for displacing the sugar liquid contained in the tower 2 through a blow pipe 11 and washing the resin 1. Next, the countercurrent washing water is supplied via countercurrent water supply pipe 6 for removal of suspended matter accumulated in the bed of resin 1, and the waste washing water is discharged via countercurrent washing water drain pipe 7. This countercurrent washing step may be omitted if only a minor amount of suspended matter is deposited in the resin layer.

Then, an enzyme solution of predetermined density, at 50° to 70° C., previously conditioned in an enzyme dissolution tank 8, is forced into tower 2 through an enzyme solution supply pipe 10, by the operation of pump 9 and the early replacement water, flowing out from the bottom of the separation tower 2, is blown out through blow pipe 11. Blow-out of the enzyme solution is terminated as soon as the enzyme liquid having about the same density as that of supplied enzyme has started to flow out of blow pipe 11. The enzyme liquid is allowed to remain in the tower 2 for over 2 and preferably 10 hours, or the enzyme liquid, flowing out from separation tower 2, is returned by circulation pipe 12 into enzyme dissolution tank 8 and recycled for over 2 and preferably over 10 hours.

If the separation tower 1, circulation pipe 12, enzyme dissolution tank 8 and enzyme solution supply pipe 10 etc. are coated with suitable thermal insulation, the enzyme solution and resin 1 may be contacted with each other at 50° to 70° C. over prolonged time.

By contacting the enzyme solution and the resin 1 as described above, the high polymer organic matter, deposited on the inside and outside of resin particles are decomposed by the enzymic action and desorbed from inside and outside the particles. After such reaction of decomposition has proceeded sufficiently, demineralized water is supplied through supply pipe 4, so that the resident liquid containing the low molecular weight decomposition product is replaced through blow pipe 11. Next, the resin 1 is washed with demineralized water to complete the regeneration process. It is now supposed that complex treatment by the oxidant solution and the alkaline table salt solution, considered to be most effective among conventional regenerative processes for desorption of organic matter, is applied to the above apparatus. In this case, since the strongly acidic cation exchange resin is of calcium type, it is necessary to carry out a complicated process comprising supplying a table salt solution, hydrochloric acid etc. for desorbing calcium from the resin, treating the resin with an oxidant solution and an alkaline, table salt solution in this order, thoroughly washing the resin with demineralized water, then supplying a calcium chloride solution to convert the strongly acidic cation exchange resin into a calcium type one, and washing the resin with demineralized water. Despite such complex operation, sufficient regenerative effects may not be obtained. According to the present invention, the aim in view may be attained by a simple process of contacting the enzyme solution with resin without the necessity of redundant operations in advance of the regenerative process. Moreover, the ion type of the strongly acidic resin remains to be of calcium type even after completion of the regenerative process and any redundant operation is not required following regenerative process.

The regeneration process of the present invention has a number of advantages over conventional methods as described above.

The present invention will be described by the examples.

EXAMPLE 1

Fresh cation exchange resin XT-1022 having strong acidity (manufactured by Tokyo Yuki Kagaku Kogyo KK) was adjusted to calcium type and 1620 ml of the resin was filled in a column of 23 mm inside diameter and 4 m height. The water inside the column was replaced by warm water at 60° C. 518 mls. of an isomerization liquid sugar at 60° C., obtained by starch saccharification, with total sugar density (Bx) of 45% and fructose and glucose contents related to the total sugar being 42% and 52% respectively, was supplied into the column and warm water at 60° C. was supplied continuously to effect the chromatographic separation. The effluent was sampled by 81 mls each time since sugar was first detected until no sugar could be detected in the effluent. The sampled fractions were numbered 1 through 16 in the order of efflux and the total sugar density, glucose density and fructose density of each fraction were measured. The density distribution is shown in Table 2.

The capacity of the fresh cation exchange resin for separating the crude mixture into glucose and fructose was calculated by the formulas recited below. The results are plotted in FIG. 3. Thus, in FIG. 2, the respective sums of fructose contents and fructose recovery ratios of the liquid fractions No. 16 through to fraction No. i, where i stands for any integer from 1 to 16, beginning from fructose contents and frustose recovery ratio only for fraction No. 16, followed by fructose contents and fructose recovery ratios for fractions Nos. 15 and 16 added together and so forth, were calculated by using the formulas (1) and (2) below. The curve N shown in FIG. 3 was obtained by plotting the fructose contents on the ordinate and the recovery ratios on the abscissa. (The above liquid passing test is referred to below as separation test).

Assuming that the first fraction is fraction No. 1, an intermediate arbitrarily selected fraction is fraction No. i and the last fraction is fraction No. n (which is No. 16 in FIG. 2), Formula (1)

(fructose contents in percent of the liquids of the fractions No. n through to No. i added together)

$$= \frac{\sum_{n}^{i} \text{solid fructose contents in the respective fractions}}{\sum_{n}^{i} \text{solid total sugar contents in the respective fractions}}$$

Formula (2)

(fructose recovery ratios in percent of the fractions No. n through to No. i added together)

$$= \frac{\sum_{n}^{i} \text{solid fructose contents in the respective fractions}}{\sum_{n}^{1} \text{solid fructose contents in the respective fractions}}$$

Next, 10 liters of the calcium type cation exchange resin XT-1022, which was used for about 12 months for chromatographic separation of fructose-glucose mixed liquid obtained by starch saccharification and which was lowered in its separation capability, was sampled from the apparatus used in the actual operation and subjected to the following regenerative process.

1620 mls. of the above used resin was put to the separation test in the same way as the new resin, without any treatment for the used resin. The curve 1 in FIG. 3 represents fructose contents plotted against fructose recovery ratio. This curve is lower in the graph than the one for the new resin, thus indicating the markedly lowered separation capability of the used resin.

Next, to 1620 mls. of the used resin was supplied 1 N hydrochloric acid at ambient temperature at a ratio of 2 liters per liter of resin. Then, the 1 N aqueous solution of calcium chloride was supplied at a ratio of 2.5 liters per liter or resin, after washing the resin with water, for converting the resin into calcium type, in accordance with the conventional regeneration process. The curve 2 in FIG. 3 shows the results of the separation test conducted with the thus regenerated resin. The separation capability was thus found to be slightly improved by the hydrochloric acid treatment.

Next, to 1620 mls. of the used resin was fed a 10% aqueous table salt solution at a rate of 5 liters to 1 liter of resin for converting the resin into Na type. Then, in accordance with the conventional process, the 1% sodium hypochlorite solution was fed to the resin at ambient temperature in amount of 15 liters per liter of resin at space velocity of 4. After displacement with water, an alkaline table salt solution containing 10% of table salt and 1% of sodium hydroxide was fed to the resin at a rate of 2 liters per liter of resin. The resin was then washed with water and converted to calcium type by the 1 N aqueous solution of calcium hydroxide, which was supplied at a rate of 2.5 liters per liter of resin. The curve 3 in FIG. 3 represents the results of the separation test conducted on this resin. Thus, a certain recovery of the separation capability could be obtained by the treatment with a sodium hypochlorite solution and an alkaline table salt solution. Although the separation capability was better than that obtained with hydrochloric acid treatment, it was still insufficient.

Then, according to the inventive regenerative method, to 1620 mls. of the used resin was fed a mixed enzyme aqueous solution, pH 9.0, 60° C., containing 0.25 wt.% of amylase (an enzyme manufactured by Novo Industries Inc. under trade name of Termamil, activity 60 KNU/g and 0.25 wt.% of protease (an enzyme manufactured by Novo Industries Inc. under trade name of Alcalase, activity 0.6 Au/g) was supplied at a rate of 2.0 liter per liter of resin. The used resin was allowed to stand at 60° C. for 16 hours as it was immersed in such aqueous solution, and the resin was then washed with water. The curve 4 in FIG. 3 shows the results of the separation test conducted on this resin. Thus, recovery of the separation capability could be obtained by treatment with amylase-protease mixed liquid treatment and the degree of such recovery was superior to that resulting from any of the conventional methods and only slightly inferior to that of the new resin.

Then, according to the inventive regenerative method, to 1620 mls. of the same used resin was supplied the above 0.25 wt. % aqueous amylase solution, pH 6.5, 60° C., at a rate of 2.0 liter per liter of resin. The used resin thus immersed in the enzyme solution was allowed to stand at 60° C. for 16 hours and then washed with water. The separation test was conducted on this resin and the curve 5 of FIG. 3 was obtained. As apparent from this curve, the separation capability was now recovered by the amylase treatment to the same level as that of the new resin.

Next, to 1620 mls. of the same used resin was supplied the above 0.25 wt.% aqueous protease solution, pH 9.0, 60° C., at a rate of 2.0 liter per liter of resin, also in accordance with the inventive regenerative process. The used resin was allowed to stand as it was immersed in the enzyme solution at 60° C. for 16 hours, and was then washed with water. The curve 6 in FIG. 3 shows the result of the separation test conducted on this resin. Thus, certain recovery in the separation capability could be obtained by the protease treatment and the degree of such recovery was slightly inferior to that attained by new resin but superior to that obtained with any conventional methods.

EXAMPLE 2

1620 mls. of the fresh strongly acidic cation exchange resin XT-1007 (manufactured by Tokyo Yuki Kagaku Kogyo KK), converted to Na type, was filled in a column 23 mm in inside diameter and 4 mm in height and the water in the column was replaced by warm water at 60° C. Then a maltose maltotriose mixture, 520 mls., prepared by starch saccharification, 60° C., total sugar density (Bx) 40%, maltose contents 88.3% and maltotriose contents 7.2%, was made to flow through the column. Further, warm water at 60° C. was made to flow continuously to effect the chromatographic separation, and the effluent was sampled by 81 ml fragments since the sugar was first detected in the effluent until the effluent contained no sugar. An analysis was made of the density for maltose, maltotriose and other sugar for the respective fractions to effect the measurement of the separation capability of the resin in the same way as in Example 1. The result of the measurement is shown by the curve N in FIG. 4.

Then the strongly acidic cation exchange resin XT-1007 of the Na type, which was used for about 12 months for chromatographic separation of maltose-maltotriose mixed crude liquid, obtained by starch saccharification and thus affected in its separation capability was sampled from the apparatus in actual employment, and put to the following regenerative process.

This used resin, 1620 mls., was subjected, without any pretreatment, to the separation test in the same way as for new resin. The curve 1 in FIG. 4 shows the maltose contents plotted against maltose recovery ratio. This curve is markedly lower in the graph than the corresponding curve for the new resin, thus indicating the markedly affected separation capability of the used resin.

Next, to 1620 mls. of the used resin was supplied the same 0.25 wt.% aqueous amylase solution as employed in Example 1, at 60° C., pH 6.5, at a rate of 2 liter of the aqueous solution per 1 liter of resin, in accordance with the inventive regenerative process. The used resin was allowed to stand at 60° C. for 16 hours as it was immersed in the enzyme solution, and was then washed with water. The curve 2 in FIG. 4 shows the result of the separation test conducted on this resin. It may be noted from this curve that the separation capability of the used resin was now recovered by this amylase treatment to the same level as that obtained with the new resin.

Next, to 1620 mls. of the used resin was supplied the same 0.25 wt.% aqueous protease solution as that employed in Example 1, at 60° C., pH 9.0, at a rate of 2 liter of the aqueous solution to 1 liter of resin, again in accordance with the inventive regenerative process. The resin thus immersed in the enzyme solution was allowed to stand at 60° C. for 16 hours, and was then washed with water. The curve 3 in FIG. 4 shows the result of the separation test conducted on this resin. It may be noted that certain recovery of the separation capability could be obtained by the protease treatment, although somewhat inferior to that attained with the new resin.

We claim:

1. A process for regenerating a strongly acidic cation exchange resin having organic matter deposited on surfaces thereof comprising contacting said strongly acidic cation exchange resin with an enzyme solution whereby said organic matter is removed from the surfaces of said resin.

2. A process for regenerating a strongly acidic cation exchange resin as claimed in claim 1, wherein said resin is contacted with the enzyme solution at a temperature of 30° to 100° C. for at least two hours.

3. A process for regenerating a strongly acidic cation exchange resin as claimed in claim 1, wherein the enzyme solution is a solution of amylase.

4. A process for regenerating a strongly acidic cation exchange resin as claimed in claim 1, wherein the enzyme solution is a solution of protease.

5. A process for regenerating a strongly acidic cation exchange resin as claimed is claim 1, wherein the enzyme solution is a solution of a mixture of amylase and protease.

6. A process for regenerating a strongly acidic cation exchange resin as claimed in claim 1, wherein the enzyme solution is held in contact with a layer of said resin for a predetermined period.

7. A process for regenerating a strongly acidic cation exchange resin as claimed in claim 1, wherein the enzyme solution is recycled through a layer of said resin for a predetermined period.

8. A process for regenerating a strongly acidic cation exchange resin as claimed in claim 1 wherein the cation exchange resin having organic matter deposited on surfaces thereof is obtained by contacting a strongly acidic cation exchange resin with a sugar liquid obtained by the saccharification of starch.

9. A process for regenerating a strongly acidic cation exchange resin having polysaccharides and/or proteins deposited on surfaces thereof comprising contacting said strongly acidic cation exchange resin with an enzyme solution whereby each of said polysaccharides and/or proteins is removed from the surfaces of said resin.

10. A process for regenerating a strongly acidic cation exchange resin as claimed in claim 9 wherein the cation exchange resin having polysaccharides and/or proteins deposited on surfaces thereof is obtained by contacting a strongly acidic cation exchange resin with a sugar liquid obtained by the saccharification of starch.

11. A process for regenerating a strongly acidic cation exchange resin as claimed in claim 9, wherein said resin is contacted with the enzyme solution at a temperature of 30° to 100° C. for at least two hours.

12. A process for regenerating a strongly acidic cation exchange resin as claimed in claim 9 wherein the enzyme solution is a solution of amylase.

13. A process for regenerating a strongly acidic cation exchange resin as claimed in claim 9, wherein the enzyme solution is a solution of protease.

14. A process for regenerating a strongly acidic cation exchange resin as claimed in claim 9, wherein the enzyme solution is a solution of a mixture of amylase and protease.

15. A process for regenerating a strongly acidic cation exchange resin as claimed in claim 9, wherein the enzyme solution is held in contact with a layer of said cation exchange resin.

16. A process for regenerating a strongly acidic cation exchange resin as claimed in claim 9, wherein the enzyme solution is recycled through a layer of said cation exchange resin for a predetermined period.

* * * * *